Patented Jan. 12, 1954

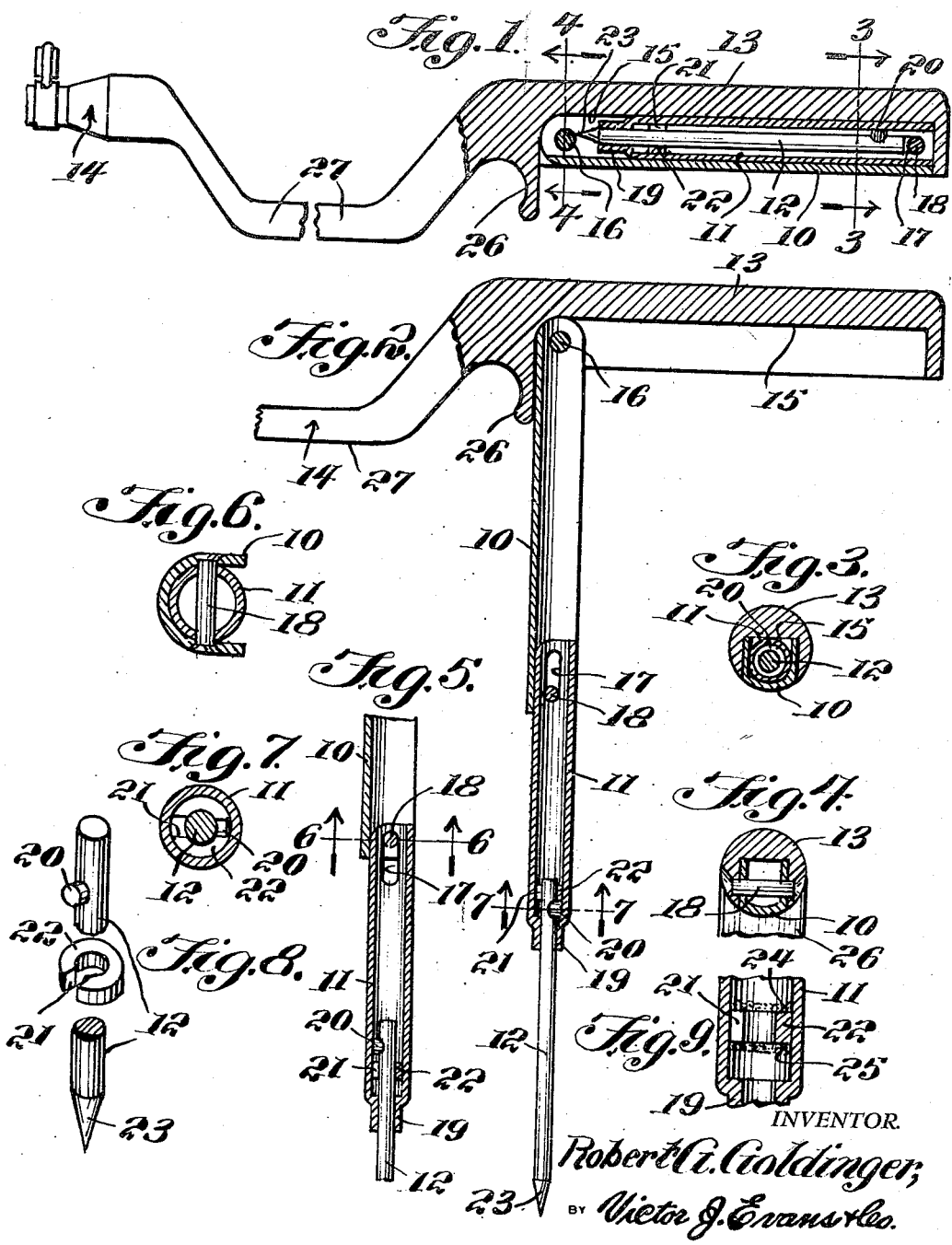

2,665,866

UNITED STATES PATENT OFFICE 2,665,866

COLLAPSIBLE FISHING ROD STAND

Robert G. Goldinger, Codell, Kans.

Application April 20, 1951, Serial No. 222,134

1 Claim. (Cl. 248—46)

This invention relates to supports for fishing rods, and in particular a folding or collapsible post nested in a cavity in the under surface of the handle of a fishing rod whereby the post is adapted to be extended for supporting the fishing rod and with the post nested in the handle the rod may be used for casting and the like.

The purpose of this invention is to provide a leg or post for supporting a fishing rod that is permanently attached to the rod and that does not interfere with casting or conventional use of the rod.

Various types of supporting devices have been pivotally and otherwise attached to fishing rods but where the device is attached to the outer surface of the rod either permanently or temporarily it interferes with general use of the rod. With this thought in mind this invention contemplates a folding support that is nested in the handle of a fishing rod and that is adapted to be drawn out to an extended position for supporting the rod.

The object of this invention is, therefore, to provide means for constructing an extensible support so that it may be nested in a cavity in the intermediate part of the handle of a fishing rod when not in use.

Another object of the invention is to provide a folding or telescoping rod or post that may be incorporated in the handle of a fishing rod without enlarging the handle.

A further object of the invention is to provide a folding support for fishing rods that is adapted to be nested in a cavity in the handle, which is of a comparatively simple and economical construction.

With these and other objects and advantages in view the invention embodies a fishing rod handle having a cavity in the under surface thereof, a channel shape member pivotally mounted in the cavity of the handle, a tubular member slidably mounted in the channel shape member and a point slidably mounted in the said tubular member.

Other features and advantages of the invention will appear from the following description taken in connection with the drawings wherein:

Figure 1 is a side elevational view of the handle of a fishing rod with part broken away and shown in section and showing a support nested in a cavity in the handle.

Figure 2 is a similar view showing the support in the extended position.

Figure 3 is a cross section through the handle taken on line 3—3 of Figure 1.

Figure 4 is a similar section taken on line 4—4 of Figure 1.

Figure 5 is a longitudinal section through the connecting ends of parts of the folding support with parts broken away.

Figure 6 is a cross section through the support taken on line 6—6 of Figure 5 and showing the parts on an enlarged scale.

Figure 7 is a similar section taken on line 7—7 of Figure 2.

Figure 8 is a detail illustrating the point with parts broken away and showing the retaining collar positioned between the broken away parts.

Figure 9 is a longitudinal section through the lower end of the tube in which the point is mounted showing the lower end of the tube with other parts omitted and with the ends broken away.

Referring now to the drawings wherein like reference characters denote corresponding parts the collapsible fishing rod handle of this invention includes an upper section 10 U-shape in cross section, a tube 11 pivotally mounted in the lower end of the section 10, a point 12 slidably mounted in the tube 11 and a handle 13 of a fishing rod 14.

The handle 13 is provded with a cavity 15 that extends inwardly from the under surface and the section 10 is pivotally mounted in the cavity by a pin 16 whereby the section is adapted to fold to a nested position in the handle as illustrated in Figures 1 and 3 with the back of the section 10 completing the lower surface of the handle. It will be noted, in Figure 3, that the back of the section 10 is formed on a radius taken from the center of the handle and corresponding with the radius of the handle.

The tube 11 is provided with slots 17 in the upper end through which a pin 18 is positioned and with the upper ends of the slot 17 spaced comparatively close to the end of the tube the tube may be drawn downwardly to the position shown in Figure 5 and turned or folded to the position shown in Figure 1. With the tube moved upwardly on the pin 18, as shown in Figure 2 the tube is rigidly held by the section 10.

The lower end of the tube 11 is drawn inwardly providing a nipple 19 of reduced diameter and in which the point 12 is slidably mounted. The point 12 is provided with a projection 20 that is positioned to pass through a slot 21 in a retaining collar 22 that is positioned around the inner surface of the tube and spaced from the upper end of the nipple 19 whereby with the projection drawn downwardly through the slot 21 and turned to an angle of 180 degrees the projection is secured below the retaining collar, as shown in Figure 2. The lower end of the point 12 is provided with a sharp point 23 whereby the support may be inserted in the ground or other supporting surface.

The retaining collar 22 is preferably secured in position by welding as shown at the points 24 and 25 in Figure 9, although it will be understood that the collar may be secured in the tube by other suitable means.

The forward end of the handle is provided with a projection 26 that is positioned to engage the outer surface of the section 10 for supporting the extended end of the fishing rod and it will be understood that this projection may be of any suitable shape or design.

In the design shown the handle is provided on a fishing rod having an offset section 27 for holding the reel and it will also be understood that the handle may be of any suitable type or design and may be used on a fishing rod of any type.

It will be understood that other modifications may be made in the design and arrangement of the parts without departing from the spirit of the invention.

What is claimed is:

In a collapsible fishing rod stand, a first section having a U-shaped cross section, a tube provided with a pair of slots in its upper end, a pin extending through said slots and through said first section, the lower end of said tube being shaped to provide a nipple of reduced diameter, a bar projecting through said nipple and having a lower pointed end, a cylindrical lug extending from said bar, a retaining collar secured within said tube and spaced above said nipple, said collar being provided with a slot for receiving said lug.

R. G. GOLDINGER.

References Cited in the file of this patent

UNITED STATES PATENTS

| Number | Name | Date |
|---|---|---|
| 888,896 | Howard | May 26, 1908 |
| 1,092,548 | Weber | Apr. 7, 1914 |
| 1,271,073 | Patten | July 2, 1918 |
| 1,534,642 | Hougland | Apr. 25, 1925 |
| 2,232,621 | Monroe | Feb. 18, 1941 |
| 2,241,183 | Ceder | May 6, 1941 |
| 2,360,402 | Determan | Oct. 17, 1944 |
| 2,546,079 | Seviola | Mar. 20, 1951 |

FOREIGN PATENTS

| Number | Country | Date |
|---|---|---|
| 34,021 | Sweden | Dec. 18, 1912 |
| 35,082 | France | of 1929 |
| 75,674 | Switzerland | of 1917 |
| 408,375 | Great Britain | Apr. 12, 1934 |